Figure 1:
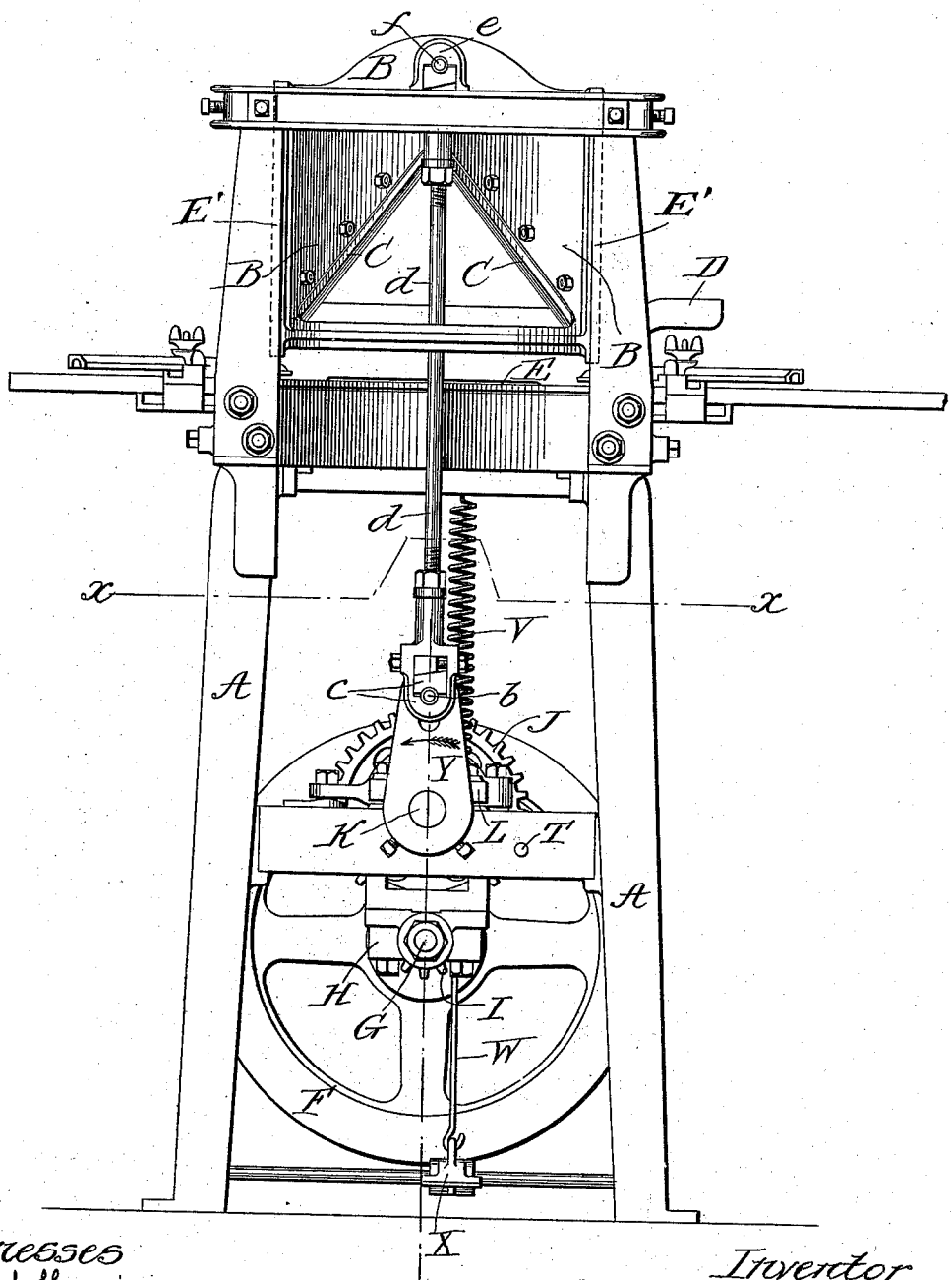

(No Model.) 5 Sheets—Sheet 2.

W. ZOELLER.
MACHINE FOR CUTTING MOLDINGS.

No. 535,438. Patented Mar. 12, 1895.

Witnesses
Inventor
William Zoeller
by Chas. G. Page
Atty (No Model.) 5 Sheets—Sheet 3.
W. ZOELLER.
MACHINE FOR CUTTING MOLDINGS.
No. 535,438. Patented Mar. 12, 1895.
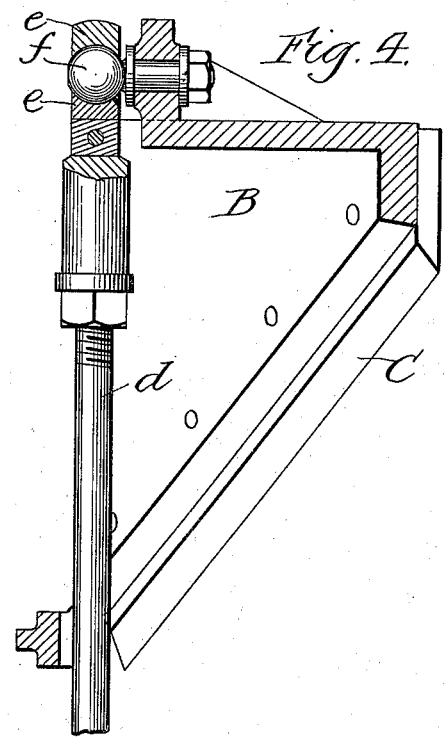
Fig. 4.
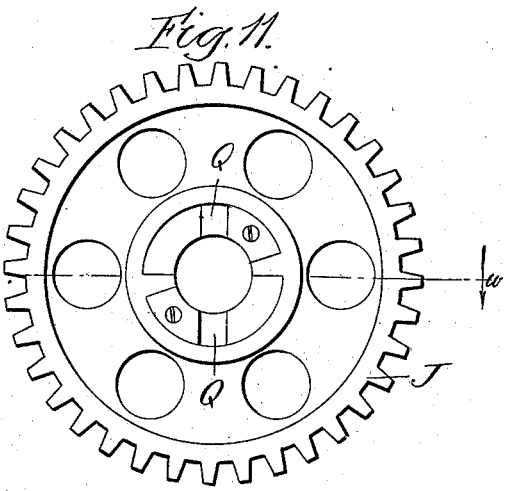
Fig. 11.
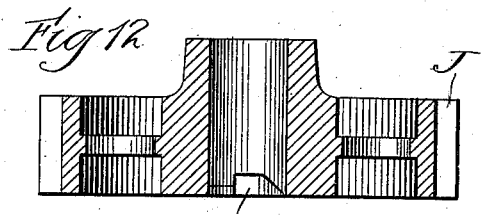
Fig. 12.
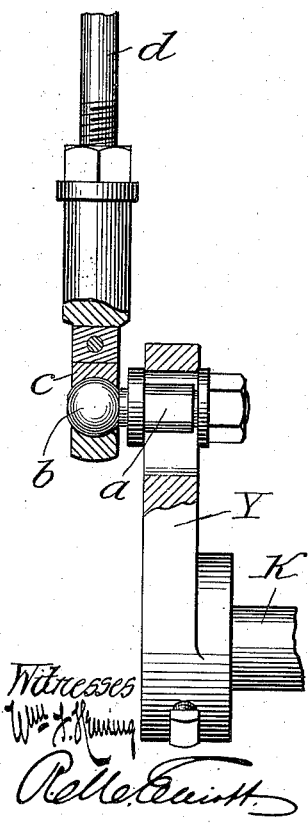
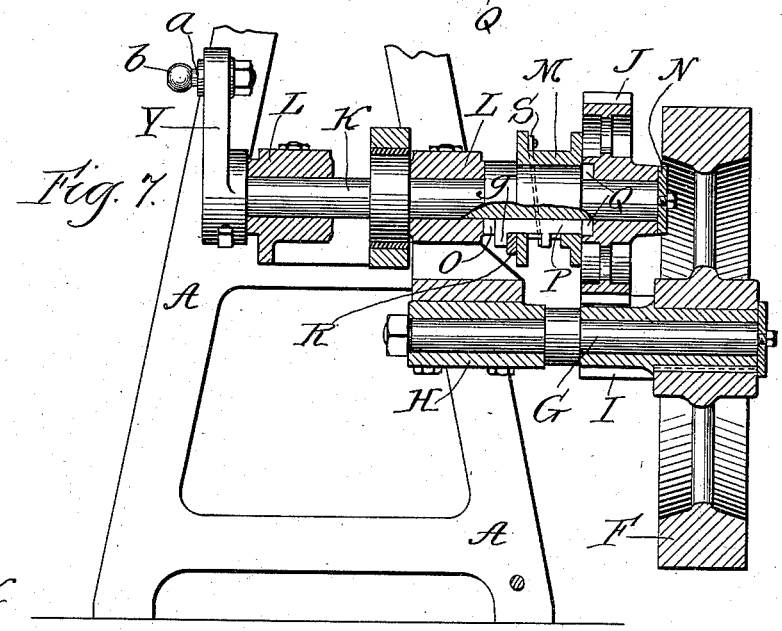
Fig. 7.
Witnesses
Inventor
William Zoeller
by Chas. G. Page
Atty.

(No Model.) 5 Sheets—Sheet 4.
W. ZOELLER.
MACHINE FOR CUTTING MOLDINGS.
No. 535,438. Patented Mar. 12, 1895.
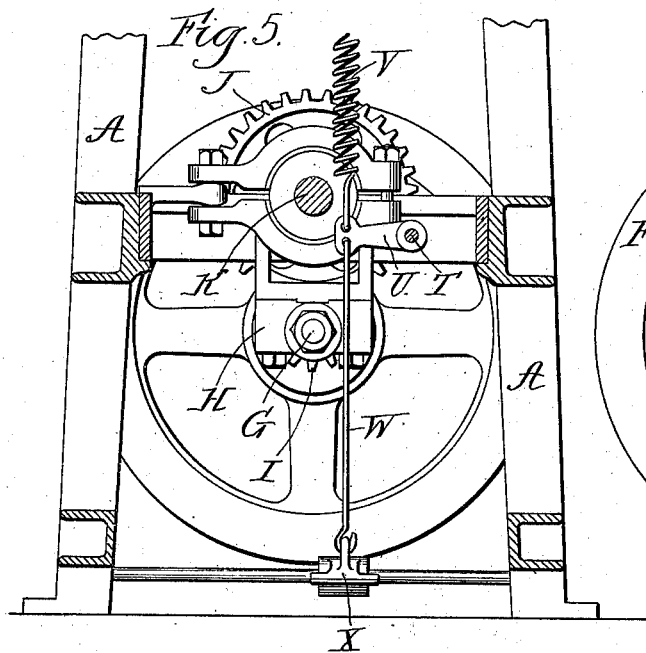
Fig. 5.
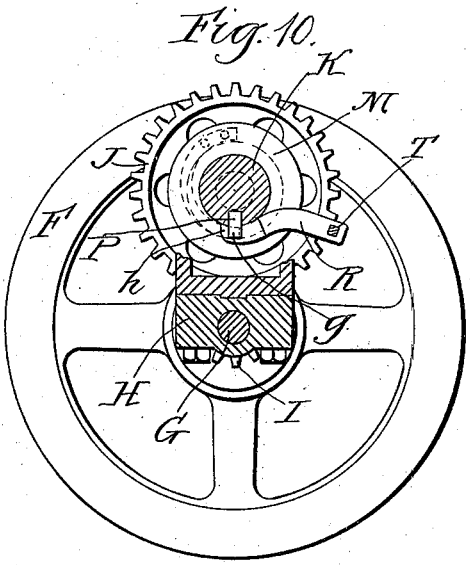
Fig. 10.
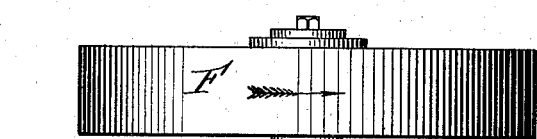
Fig. 6.
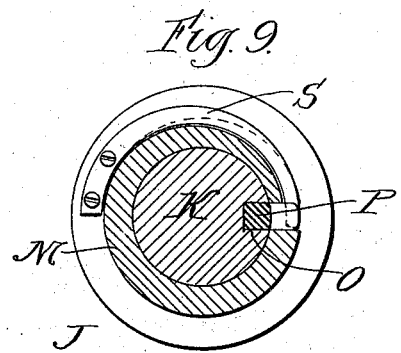
Fig. 9.
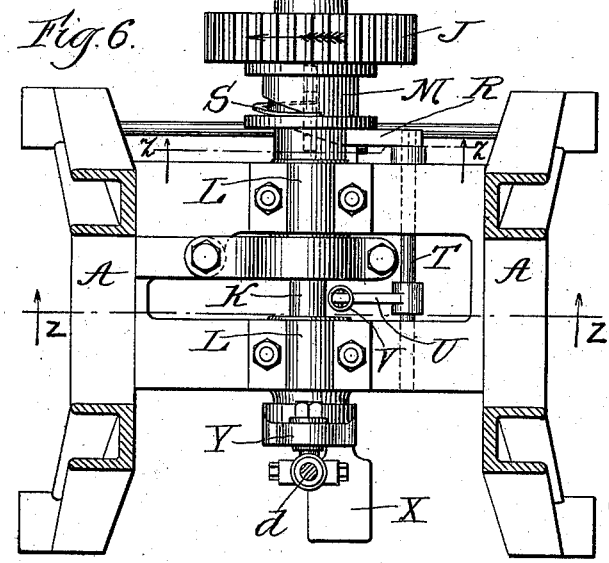
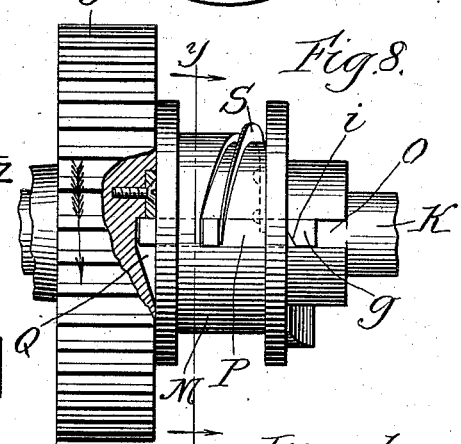
Fig. 8.
Witnesses Fig. 13. Inventor
William Zoeller
by Chas. G. Page Atty.
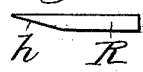
THE NORRIS PETERS CO., PHOTO-LITHO., WASHINGTON, D. C.

(No Model.) 5 Sheets—Sheet 5.

W. ZOELLER.
MACHINE FOR CUTTING MOLDINGS.

No. 535,438. Patented Mar. 12, 1895.

Witnesses:
Arthur F. Dinand.
Rela M. Wagner.

Inventor:
William Zoeller.
by Chas. S. Page. Atty.

UNITED STATES PATENT OFFICE.

WILLIAM ZOELLER, OF CHICAGO, ILLINOIS.

MACHINE FOR CUTTING MOLDINGS.

SPECIFICATION forming part of Letters Patent No. 535,438, dated March 12, 1895.

Application filed June 26, 1894. Serial No. 515,726. (No model.)

*To all whom it may concern:*

Be it known that I, WILLIAM ZOELLER, a citizen of the United States, residing at Chicago, in the county of Cook and State of Illinois, have invented a certain new and useful Improvement in Machines for Cutting Moldings, of which the following is a specification.

My invention relates to machines for cutting moldings of the kind in which a stationary guide or abutment for the molding to be cut is employed in conjunction with a vertically reciprocatory knife adapted to be moved to and from the guide. In machines of this character as heretofore constructed, the knife has been actuated by foot-power, and while operating satisfactorily for cutting light moldings or moldings of soft wood, it has been found in cutting heavy moldings or moldings of hard wood, that the power transmitted to the knife is not sufficient to force it at a single cut through moldings of the latter class, thereby necessitating two or more impacts being made to complete a miter. This is objectionable from the fact that a smooth and finished miter cannot conveniently be made by a succession of impacts, and further, that there is danger of scaling or cracking the finished surface of the molding adjacent to the cut. It is the object of the present invention to overcome these obstacles by adapting the machine to be driven by steam or other mechanical power whereby to increase the cutting power of the knife, and to render its operation positive in all its movements, and as a result to adapt the machine to do more and better work in a given time than would be possible if the knife were actuated by foot-power.

In constructing a machine in accordance with my invention, I employ a stationary guide or abutment for the molding and in conjunction therewith a frame carrying a knife together with mechanism for moving the frame horizontally to and from the guide. As a matter of further improvement I provide a power mechanism for imparting a vertical reciprocating movement to the knife-frame comprising in this instance a drive-shaft carrying a drive-wheel and a pinion, and a crank-shaft carrying a gear in mesh with the pinion, said gear being arranged normally to rotate on the crank-shaft without imparting motion thereto. The crank-shaft operates the knife-frame through the medium of a pitman-rod, the joint or connection between the pitman and the crank-shaft and knife-frame comprising in this instance a ball and socket joint, such arrangement permitting of the knife-frame being moved in a horizontal plane without interrupting or interfering with the action of the rod in its reciprocating movements. As it is desirable that the knife frame should stop at the upward limit of its return stroke, means are employed when the knife has made a full stroke or cut, to cause it to automatically stop and thereby permit the work to be removed. The stop mechanism in this instance comprises a bolt or locking-pin working in a slot or key-way formed in the crank-shaft, and adapted to engage at one end with one of a series of teeth or depressions formed in one of the faces of the gear on the crank-shaft. The bolt is held normally out of engagement with said teeth by means of a dog and is forced into engagement with the teeth after being released by the dog by means of a spring or the like.

Various other novel details of construction will hereinafter be fully set forth.

Figure 2:
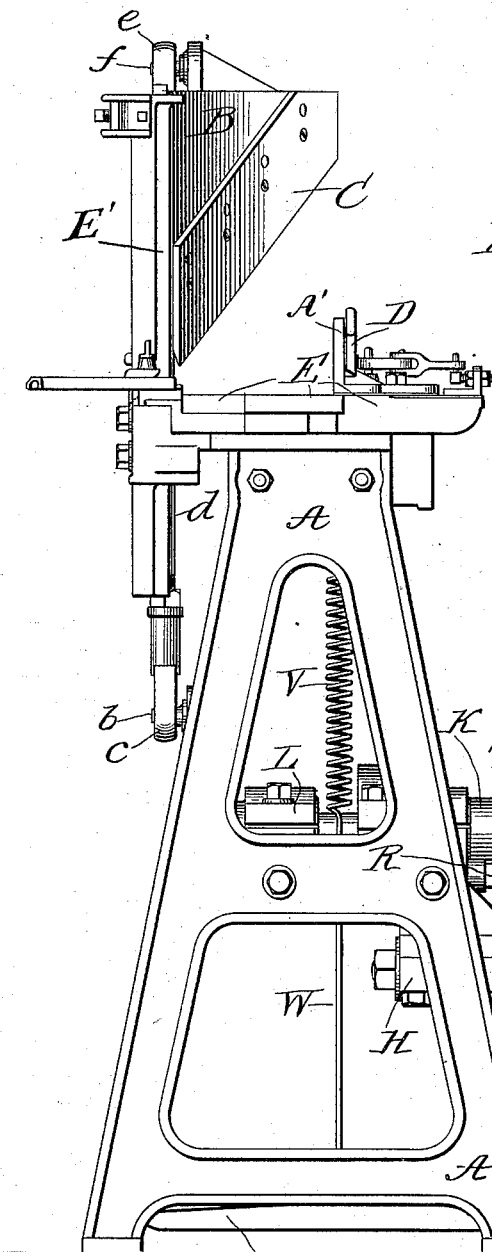
Figure 3:
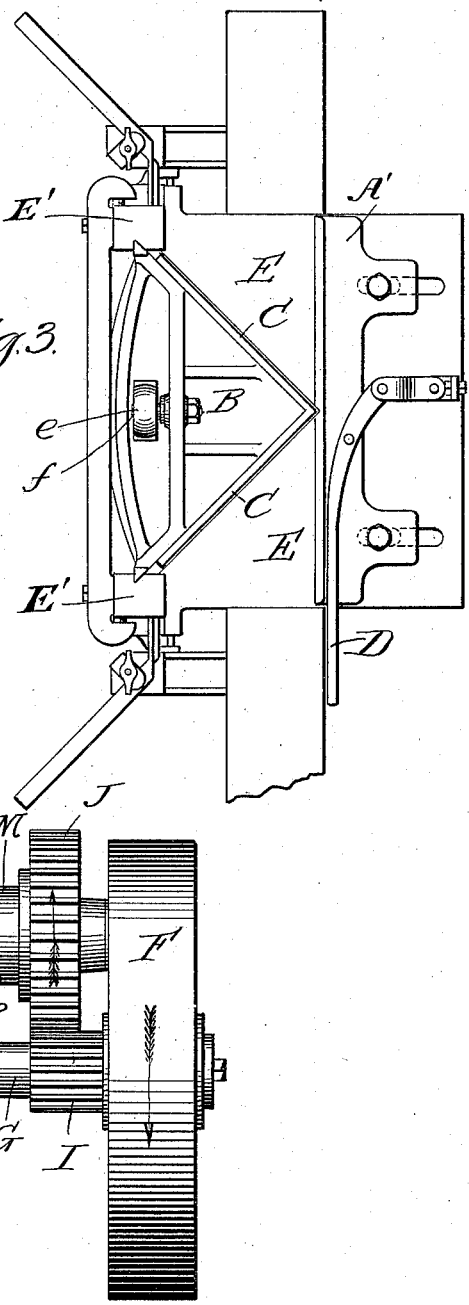
Figure 14:
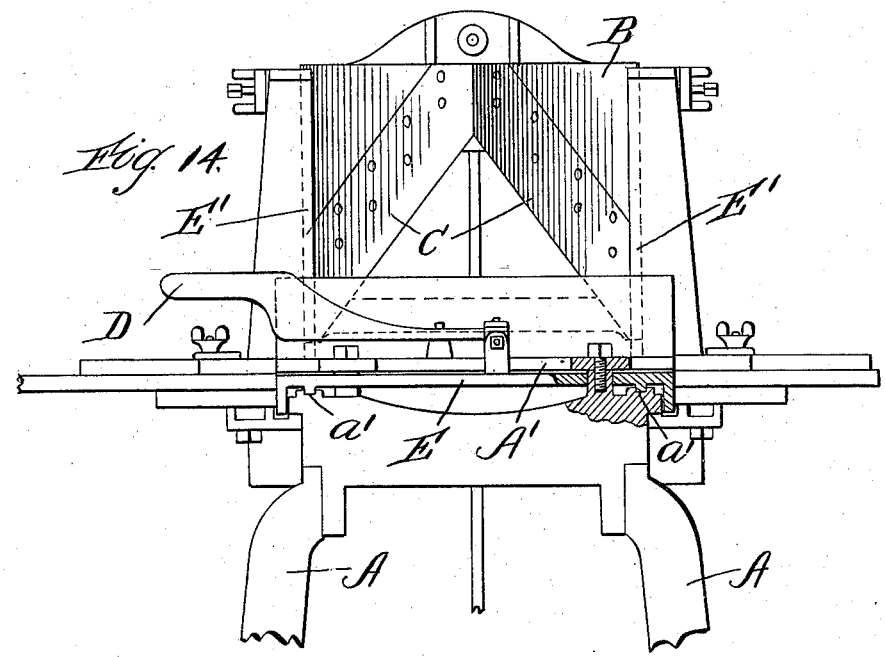
Figure 15:
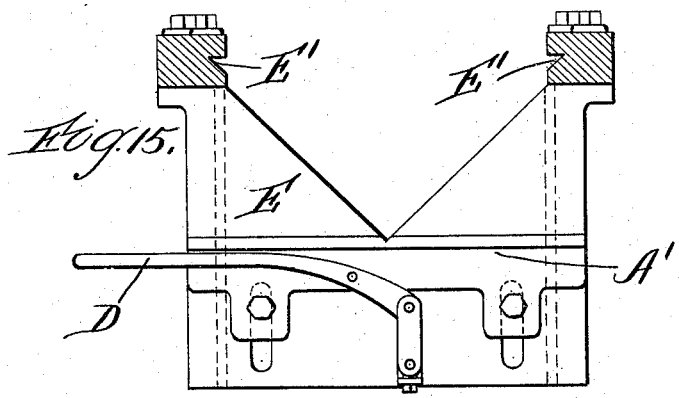
Figure 16:
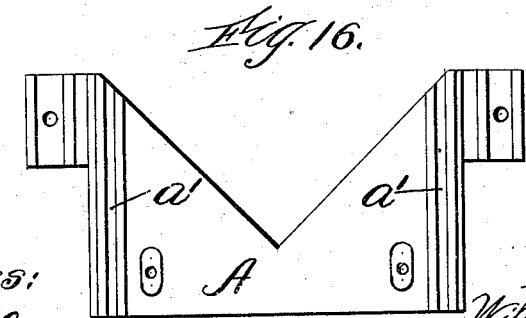

In the accompanying drawings forming a part of this specification and in which like letters of reference indicate corresponding parts, Figure 1 is a front elevation of the machine constructed in accordance with my invention. Fig. 2 is a side elevation of the same. Fig. 3 is a top plan view. Fig. 4 is a sectional elevation, showing the manner of connecting the pitman rod with the crank-shaft. Fig. 5 is a front elevation of the lower portion of the machine, partly in section, showing more particularly the connection between the treadle and the dog for releasing and locking the bolt of the operating gear. Fig. 6 is a top plan sectional view taken on the line $x-x$ Fig. 1. Fig. 7 is a sectional view showing the connection between the pinion of the drive-wheel, the gear in mesh therewith and the locking bolt. Fig. 8 is an enlarged detail view of the gear, showing the spring for actuating the locking bolt. Fig. 9 is a transverse sectional view taken on the line $y-y$ Fig. 8, and looking in the direction of the arrows indicated thereon. Fig. 10 is a transverse sectional view taken on the line $z-z$ Fig. 6 and looking in the direction of the arrows indicated thereon. Fig. 11 is a front elevation of the crank-shaft operating gear, showing more particularly the teeth or depressions with which the locking bolt engages. Fig. 12 is a longitudinal sectional view taken on the line $w$—$w$ Fig. 11. Fig. 13 is a detached detail view of the dog for engaging the locking bolt. Fig. 14 is a rear elevation of the upper portion of the machine with a part of the frame table and ledge in section. Fig. 15 is a top plan of the table alone. Fig. 16 is a top plan of the frame with the table removed.

Referring to the drawings A designates a suitable frame work upon which is mounted a sliding plate or table E, working in guides $a'$ $a'$ and forming a support for the molding to be cut. The table E in turn supports a frame B working in guides E', E' and carrying the knife C. Longitudinal motion is given to the plate or table E, and therefore imparted to the frame B, by means of a lever D thereby causing the knife C to move to or from the ledge A' which is rigid with the frame A and arranged to form a bearing for the molding.

The parts thus far described together with the objects of imparting motion to the table E are fully shown and explained in Patent No. 286,423 owned by me, and hence further description is deemed unnecessary it being understood that the sliding table which carries the knife is arranged for horizontal adjustment.

The mechanism for imparting a vertical reciprocating motion to the knife C, and which forms the essential feature of the present invention comprises a drive-wheel F which is suitably mounted upon a shaft G journaled in bearings H on the frame. The drive-wheel is provided with a pinion I rigid therewith, and by preference constructed in such a manner as to be readily detached from the drive-wheel either for the purpose of repair or of replacing the worn out one with the new one. Meshing with the pinion I is a gear J, which is adapted normally to rotate loosely upon a crank-shaft K supported in suitable bearings L. The gear is held in proper relation with regard to the pinion I, by means of a sleeve or collar M on one side, and a cap or plate N on the opposite side. The shaft K is provided with a longitudinal slot or key-way O in which is loosely mounted the locking bolt P, which is adapted to engage with one of a series of teeth or depressions Q arranged in one face of the gear J, said bolt being held normally out of engagement with the teeth by means of a pawl or dog R, and forced into engagement with the teeth of the pinion when released by the dog by means of a spring S. This spring as shown in Figs. 7, 8 and 9 is constructed of a curved leaf spring, but it is to be understood that its configuration may be varied to meet the requirements of different cases. The dog R is carried by a rod or shaft T to which is connected a crank or arm U, and to the latter is attached one end of a coil spring V which exerts a tension normally to keep the dog raised and in engagement with the locking bolt as shown in Fig. 10; and a rod W connecting with a treadle X by means of which the dog may be depressed so as to release the locking bolt at the proper time. The free end of the shaft K carries a crank Y to which is adjustably secured a stud $a$ having a ball $b$. Connecting with the ball $b$ by means of a socket joint $c$ is a pitman rod $d$, the upper end of which connects by a socket joint $e$ with a ballheaded stud $f$ carried by the knife frame B. By means of the ball and socket connection between the crank shaft K and the knife frame B, the latter may be moved in a horizontal plane without interfering with the action of the rod, so as to permit the knife to make light or heavy cuts as the case may require.

Having described the different parts of my device I will explain the manner of its operation.

Let it be supposed that the knife is in the position shown in Fig. 2 and that a piece of molding is to be cut. The molding having been placed in position upon the table E the treadle X is pressed down and through the medium of the rod W and arm U rocks the shaft T and forces the dog R out of engagement with the head $g$ of the locking bolt P whereupon the spring S exerts its power and forces the bolt inward and into engagement with one of the teeth Q of the gear J thereby locking it against rotation on the shaft K. As the gear is in mesh with the pinion and the latter is being constantly revolved by the drive-wheel F it follows that the full power from the drive-wheel is imparted to the gear and thus causes it to rotate the shaft K with the power equivalent to that imparted to the drive-wheel. As the shaft K makes a complete revolution, the beveled end $h$ of the dog passes between the beveled faced projection $i$ of the locking bolt and the face of the collar M and thus automatically draws the locking bolt out of engagement with the gear J and stops the knife at the limit of its upward stroke.

The ball and socket connection of the pitman-rod with the crank-shaft K and the knife-frame B renders the said rod self-adjusting with relation to the said parts—that is, the rod will automatically adjust itself on its bearings as the knife-frame is moved in and out by the lever D, so that an approximately vertical pull is always imparted to the knife-frame irrespective of the position the latter may occupy with relation to the molding support. It is to be understood, however, that other forms of connections between the pitman-rod and the knife-frame and crank-shaft may be employed to accomplish the same results, but from a point of simplicity and effectiveness the form shown is preferred.

By providing the automatic clutch which automatically disconnects the power from the crank shaft, which is in turn connected with the table by a self-adjusting power transmitting mechanism, the knife will be automatically arrested at the end of each upper stroke, whereby the table can be adjusted while the knife is inactive, it being understood that it is desirable to make two or more cuts in order to completely sever the molding and that it is therefore desirable to adjust the table which carries the knife, with reference to such cuts.

What I claim as my invention is—

1. In a machine for cutting molding, a reciprocating table or support for the molding to be cut, a knife frame constructed to be moved to and from a stationary ledge, which forms a bearing for the molding, a crank shaft, and a rod or the like connecting the crank and the frame for imparting a vertical reciprocatory motion to the frame, said rod having a self-adjusting connection with the frame and with the crank.

2. In a machine for cutting molding, a reciprocating table or support for the molding to be cut, a knife-frame constructed to be moved to and from a stationary ledge which forms a bearing for the molding, and carrying a ball-joint, a shaft carrying a crank provided with a ball joint, and a pitman rod provided with socket bearings for engaging the respective ball joints.

3. A machine for cutting molding, comprising an abutment against which the molding is held while being cut; a horizontally adjustable table carrying a knife having an up and down movement, said table being adjustable with relation to the abutment to permit the knife to make two or more cuts through the molding in order to entirely cut through the same; a crank-shaft connected with the knife by a self adjusting power transmitting connection; and an automatic clutch device arranged for automatically disconnecting the power from the crank-shaft at the end of each up stroke on the part of the knife so as to permit the table which carries the knife to be adjusted while the knife is inactive, substantially as and for the purpose described.

WILLIAM ZOELLER.

Witnesses:
R. M. ELLIOTT,
RETA M. WAGNER.